US006999423B2

(12) United States Patent
Call et al.

(10) Patent No.: US 6,999,423 B2
(45) Date of Patent: Feb. 14, 2006

(54) LINK ORDER REPLACEMENT OPTIMIZATION

(75) Inventors: Roger W. Call, Salt Lake City, UT (US); Michael J. Francl, Layton, UT (US); Patrick J. Smith, Salt Lake City, UT (US)

(73) Assignee: L-3 Communications Corp., New York, NY (US)

(*) Notice: Subject to any disclaimer, the term of this patent is extended or adjusted under 35 U.S.C. 154(b) by 918 days.

(21) Appl. No.: 09/995,219

(22) Filed: Nov. 27, 2001

(65) Prior Publication Data

US 2003/0100289 A1    May 29, 2003

(51) Int. Cl.
*H04L 12/26* (2006.01)

(52) U.S. Cl. .................. 370/238; 370/351; 370/400

(58) Field of Classification Search ............. 370/238
See application file for complete search history.

(56) References Cited

U.S. PATENT DOCUMENTS

| 5,117,422 A | * | 5/1992 | Hauptschein et al. ....... 370/255 |
| 5,546,542 A | * | 8/1996 | Cosares et al. ............. 709/241 |
| 6,044,075 A | * | 3/2000 | Le Boudec et al. ......... 370/351 |
| 6,383,319 B1 | * | 3/2002 | Hsu ........................... 701/202 |

* cited by examiner

*Primary Examiner*—Chau Nguyen
*Assistant Examiner*—Anthony Sol
(74) *Attorney, Agent, or Firm*—Perman & Green, LLP.

(57) ABSTRACT

A method and system for optimizing a mobile radio network topology for an N node network where each node has K connecting links. A base network topology is established and a cost value is determined for the base network. It is determined if all possible local transformations on the base network topology have been performed and if not a local transformation is performed on the base network to form a transformed network. A cost is calculated for the transformed network and the cost is compared with the cost of a base network. The transformed network is established as the base network if the cost of the transformed network is less than the cost of the base network.

18 Claims, 18 Drawing Sheets

|   | 1 | 2 | 3 | 4 | 5 | 6 | 7 | 8 | 9 | 10 |
|---|---|---|---|---|---|---|---|---|---|---|
| 1 | 0 | 1 |   |   |   |   |   |   |   | 1 |
| 2 | 1 | 0 | 1 |   |   |   |   |   |   |   |
| 3 |   | 1 | 0 | 1 |   |   |   |   |   |   |
| 4 |   |   | 1 | 0 | 1 |   |   |   |   |   |
| 5 |   |   |   | 1 | 0 | 1 |   |   |   |   |
| 6 |   |   |   |   | 1 | 0 | 1 |   |   |   |
| 7 |   |   |   |   |   | 1 | 0 | 1 |   |   |
| 8 |   |   |   |   |   |   | 1 | 0 | 1 |   |
| 9 |   |   |   |   |   |   |   | 1 | 0 | 1 |
| 10 | 1 |   |   |   |   |   |   |   | 1 | 0 |

CONNECTIVITY OF FIGURE 2

FIG. 12

|   | 1 | 2 | 3 | 4 | 5 | 6 | 7 | 8 | 9 | 10 |
|---|---|---|---|---|---|---|---|---|---|----|
| 1 | 0 |   | 1 |   | 1 |   |   |   |   |    |
| 2 |   | 0 | 1 | 1 |   |   |   |   |   |    |
| 3 | 1 | 1 | 0 |   |   |   |   |   |   |    |
| 4 |   | 1 |   | 0 |   |   |   |   |   | 1  |
| 5 | 1 |   |   |   | 0 | 1 |   |   |   |    |
| 6 |   |   |   |   | 1 | 0 | 1 |   |   |    |
| 7 |   |   |   |   |   | 1 | 0 | 1 |   |    |
| 8 |   |   |   |   |   |   | 1 | 0 | 1 |    |
| 9 |   |   |   |   |   |   |   | 1 | 0 | 1  |
| 10|   |   |   | 1 |   |   |   |   | 1 | 0  |

CONNECTIVITY OF FIGURE 3

FIG. 13

|   | 1 | 2 | 3 | 4 | 5 | 6 | 7 | 8 | 9 | 10 |
|---|---|---|---|---|---|---|---|---|---|---|
| 1 |   |   |   |   |   | 1 |   |   |   |   |
| 2 |   |   |   |   |   |   |   | 1 |   |   |
| 3 |   |   |   |   |   |   |   |   | 1 |   |
| 4 |   |   |   |   |   |   | 1 |   |   |   |
| 5 |   |   |   |   |   |   |   |   |   | 1 |
| 6 | 1 |   |   |   |   |   |   |   |   |   |
| 7 |   |   |   | 1 |   |   |   |   |   |   |
| 8 |   | 1 |   |   |   |   |   |   |   |   |
| 9 |   |   | 1 |   |   |   |   |   |   |   |
| 10 |   |   |   |   | 1 |   |   |   |   |   |

CROSSLINK CONNECTIVITY OF FIGURE 8

FIG. 14

|   | 1 | 2 | 3 | 4 | 5 | 6 | 7 | 8 | 9 | 10 |
|---|---|---|---|---|---|---|---|---|---|----|
| 1 |   |   |   |   |   |   |   | 1 |   |    |
| 2 |   |   |   |   |   |   |   |   | 1 |    |
| 3 |   |   |   |   |   |   |   |   |   | 1  |
| 4 |   |   |   |   |   | 1 |   |   |   |    |
| 5 |   |   |   |   |   |   |   |   |   | 1  |
| 6 |   |   |   | 1 |   |   |   |   |   |    |
| 7 | 1 |   |   |   |   |   |   |   |   |    |
| 8 |   | 1 |   |   |   |   |   |   |   |    |
| 9 |   |   | 1 |   |   |   |   |   |   |    |
| 10|   |   |   |   | 1 |   |   |   |   |    |

CROSSLINK CONNECTIVITY OF FIGURE 9

FIG. 15

|    | 1 | 2 | 3 | 4 | 5 | 6 | 7 | 8 | 9 | 10 |
|----|---|---|---|---|---|---|---|---|---|----|
| 1  | 0 | 1 |   |   |   | 2 |   |   |   | 1  |
| 2  | 1 | 0 | 1 |   |   |   | 2 |   |   |    |
| 3  |   | 1 | 0 | 1 |   |   |   | 2 |   |    |
| 4  |   |   | 1 | 0 | 1 |   |   |   | 2 |    |
| 5  |   |   |   | 1 | 0 | 1 |   |   |   | 2  |
| 6  | 2 |   |   |   | 1 | 0 | 1 |   |   |    |
| 7  |   | 2 |   |   |   | 1 | 0 | 1 |   |    |
| 8  |   |   | 2 |   |   |   | 1 | 0 | 1 |    |
| 9  |   |   |   | 2 |   |   |   | 1 | 0 | 1  |
| 10 | 1 |   |   |   | 2 |   |   |   | 1 | 0  |

LINK MATRIX WITH LOOP LINKS AND CROSSLINKS

FIG. 17

LINK ORDER REPLACEMENT OPTIMIZATION

BACKGROUND OF THE INVENTION

1. Field of the Invention

The present invention relates to mobile radio network organization and, more particularly, to mobile radio network topology optimization.

2. Brief Description of Related Developments

In a network of "N" mobile nodes where each node can have "K" radio links, the total number of possible configurations can be quite large. Generally, when it is necessary to determine the optimum configuration, it is not feasible or economical to do an exhaustive search on all possible network configurations for large N. A classical Branch Exchange ("BXC") Algorithm can result in configurations which are near the optimum.

However, classical algorithms such as the Branch Exchange Algorithm ("BXC"), while limiting the optimization search to a subset of an exhaustive search, can still require a significant number of test cases to arrive at a solution. It would be helpful to restrict the topology of the system in such a manner as to limit the search subset such that mathematical calculations are minimized.

SUMMARY OF THE INVENTION

The present invention is directed to a method of optimizing a mobile radio network topology for an N node network where each node has K connecting links. In one embodiment, the method comprises establishing a base network topology and determining a cost value for the base network. It is determined if all possible local transformations on the base network topology have been performed and if not, a local transformation is performed on the base network to form a transformed network. A cost is calculated for the transformed network and the cost is compared to the cost of a base network. The transformed network becomes the base network if the cost of the transformed network is less than the cost of the base network.

In another aspect, the present invention is directed to a method of optimizing a loop network. In one embodiment, the method comprises determining an initial cost value for an initial loop network and switching at least two links in the initial loop network to form a new loop network. A new cost value for the new loop network is determined and if the new cost value is less than the initial cost value the new loop network becomes the base loop configuration for the loop network.

In a further aspect, the present invention is directed to a computer program product. In one embodiment, the computer program product comprises a computer useable medium having computer readable program code means embodied therein for causing a computer to optimize a loop network. The computer readable program code means in the computer program product comprises computer readable program code means for causing a computer to determine an initial cost value for an initial loop network configuration, switch at least two desired replacement links in the initial loop configuration to form a test configuration and determining a new cost value for the test configuration. The computer program product also comprises computer readable program code means for causing a computer to accept the test configuration as an initial loop configuration if the new cost value is less than the initial cost value. Computer readable program code means are also included for causing a computer to determine if all desired replacement links in the initial loop configuration have been tested and to accept the initial loop configuration as a final loop configuration if the new cost value is less than the initial cost value and all desired replacements links have been tested.

BRIEF DESCRIPTION OF THE DRAWINGS

The foregoing aspects and other features of the present invention are explained in the following description, taken in connection with the accompanying drawings, wherein:

FIG. 12 is a connectivity matrix of FIG. 2.

FIG. 13 is a connectivity matrix of FIG. 3.

FIG. 14 is a cross-link connectivity matrix of FIG. 8.

FIG. 15 is a cross-link connectivity matrix of FIG. 9.

FIG. 17 is a link matrix with loop links and cross-links.

DETAILED DESCRIPTION OF THE PREFERRED EMBODIMENT(S)

Figure 1:
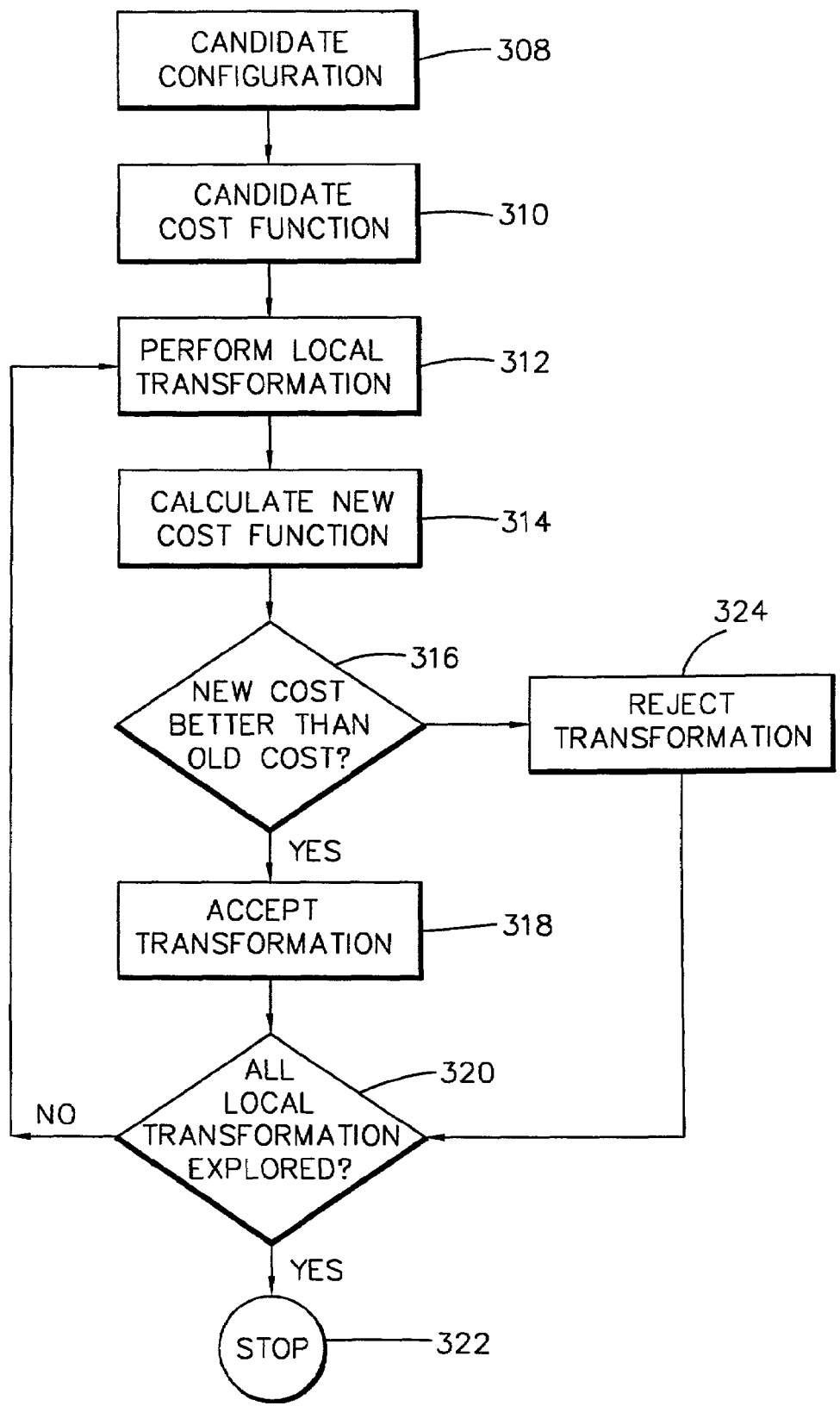
FIG. 1 is a flowchart illustrating one embodiment of a method incorporating features of the present invention.

Referring to FIG. 1, there is shown a flowchart of one embodiment of a method incorporating features of the present invention. Although the present invention will be described with reference to the embodiment shown in the drawings, it should be understood that the present invention could be embodied in many alternate forms of embodiments.

Figure 2:
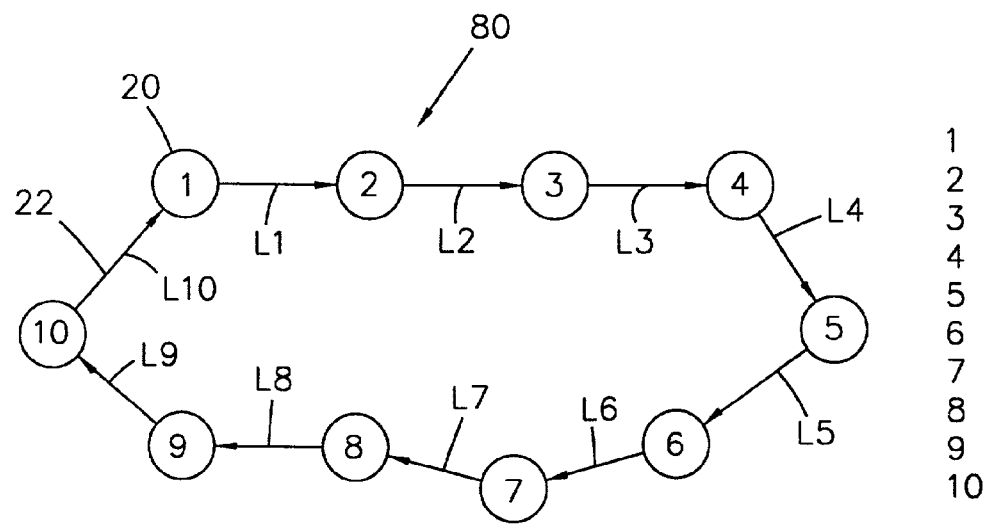
FIGS. 2–7 are illustrations of an embodiment of a loop formation example for a network topology incorporating features of the present invention.

The present invention is directed to a system and process that can be implemented to optimize a mobile radio network topology. A mobile network can generally comprise "N" mobile nodes, each with "$K_n$" radio links. Different nodes within the network can have different numbers of links. Hence, "K" is subscripted ($K_n$) to indicated dependence. A node N can have one or more links ($K_n$) connecting the node to one or more nodes in the network configuration. One possible network topology is shown in FIG. 2. In the example shown in FIG. 2, the number of nodes 20 of the loop configuration 80 in this exemplary network is ten. Each node 20 is coupled by one or more links 22 to another node.

It is a feature of the present invention to seek out a local minimum in the optimization procedure rather than seek the global minimum. The idea is to find a "best" topology within the restrictions of the procedure. In the present invention, certain restrictions can be placed on the process that can be used to constrain the topology of the network. As used herein "topology of network" is synonymous with "network configuration." For example, it may be desired to have bi-connectivity for those nodes in the network where that is possible. As used herein, the term bi-connectivity is used to mean that each node is at least doubly connected (connected to at least two other nodes). Also, there is a minimum of one link per node and may be a maximum of three links per node. In alternative embodiments, a suitable minimum and maximum number of nodes and links can be implemented. In the general branch exchange algorithm process, it is very difficult to express the restrictions in mathematical terms where machine calculations could be minimized. Thus, the present invention provides a method to arrive at a local minimum solution with a limited number of configurations to consider in order to determine the "best" solution.

Referring to FIG. 1, a flowchart illustrating one embodiment of a method incorporating features of the preset invention is shown. Generally, the method of the present invention involves forming a valid test topology, and then in a systematic manner, exchanging branches of the test topology until most or all such choices have been exhausted and a final desired topology is attained. The first step generally comprises determining 308 a candidate configuration for the network of nodes 20. The candidate configuration can be determined by implementing the desired valid test topology rules. In the general branch exchange process, it is possible to form topology configurations that are not valid.

For example, double loops are an example of a topology configuration that is not valid. The process of the present invention aims to avoid invalid configurations and reduce the number of steps. For example, referring to FIG. 2, a valid ring structure 80 is formed with those nodes 20 that have at least two links 22. This basic bi-connected ring structure 80 is maintained throughout the optimization process, although the actual radio links (or branches) 22 can be changed. Next, those nodes that have available at least three links (or exactly one link) are further integrated or incorporated into the ring structure 80.

Once the candidate configuration is determined, a cost is calculated for the candidate configuration. The cost function is generally based on first determining the least-cost path between each possible pair of nodes. This "least cost path" is determined by recursively searching through all available paths and assigning a cost to each. The cost could be a function of link bandwidths, anticipated traffic loading, and predicted connectivity.

A local transformation can then be performed 312 on the candidate configuration. A local transformation can generally comprise exchanging two of the branches or links 22 of the network by adding a new link and deleting an old link while maintaining bi-connectivity.

Figure 3:
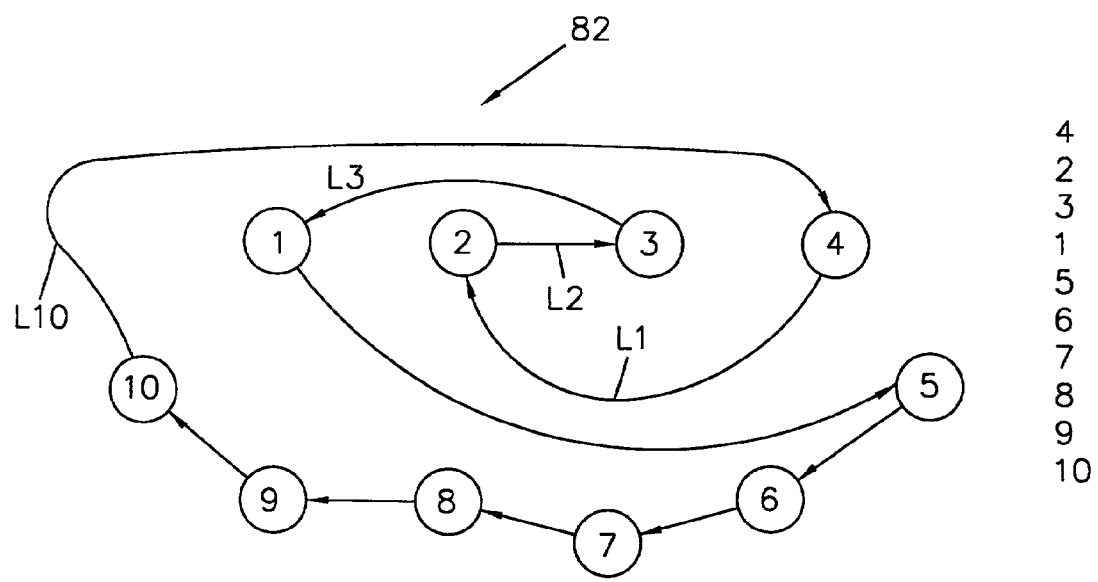

For example, the resulting configuration after a local transformation of the configuration 80 shown in FIG. 2, involving the exchange of the links for nodes 1 and 4, is shown in FIG. 3. In the new configuration 82, link L1 connects node 4 to node 2, link L2 connects node 2 to node 3, link L3 connects node 3 to node 1, link L4 connects node 1 to node 5 and link L10 connects node 10 to node 4. A local transformation may also be described or referred to as an "exchange of nodes."

After the local transformation 312, a cost is calculated 314 for the new or resulting configuration. The new cost for the new configuration is compared 316 to the previous cost to determine which cost is less. If the new cost is less than the previous one, the transformation is accepted 318. Otherwise, the transformation is rejected 324. If the transformation is accepted, a determination 320 must be made to see if all local transformations have been explored. It is a feature of the present invention to determine a configuration or topology reasonably near the best possible topology, as determined by assigning a cost to each. If all possible local transformations have not been explored, another local transformation is performed 312. If all possible configuration have been analyzed, the process can stop 322.

Referring to FIGS. 2–7, one embodiment of a loop formation incorporating features of the present invention is shown. As shown in FIG. 2, an initial loop configuration 80 is formed and can be described as an arbitrary sequence of link numbers from L1 to L10. The nodes 20 of the configuration can be described as nodes 1 to 10. In order to maintain connectivity, each node 20 is assumed to have at least one radio link 22. A cost is calculated for the configuration 80 in FIG. 2. A series of local transformations can then be performed, evaluating each one in turn with respect to its cost. For example, nodes 1 and 2 are exchanged, and a cost is calculated. The resulting configuration after nodes 1 and 2 are exchanged would have link L10 connecting node 10 to 2, link L1 connecting node 2 to 1, and link L2 connecting node 1 to 3. The local transformations can continue, exchanging node 1 and 3, then 1 and 4, etc., with a respective cost being calculated for each resulting configuration. In this example, assume that the local transformation of node 1 and 4 results in a lower cost than the original or candidate configuration. The local transformation or exchange of nodes 1 and 4 is then accepted. The resulting configuration 82 is illustrated in FIG. 3. The new loop sequence can be defined as "4, 2, 3, 1, 5, 6, 7, 8, 9, 10." At this point, in one embodiment, the test could start over again, exchanging nodes 4 and 2, then 4 and 3, etc. This embodiment thereby provides for a wider range of transformations and tests, and therefore, a possible better minimum. In an alternate embodiment, the testing could continue from the last accepted transformation, 1 and 4, and continue around the ring 82, testing 4 and 5, 4 and 6, 4 and 7, etc. All of these embodiments limit the total number of configurations to be tested, and thus reduce the total machine or computer operations.

Figure 4:
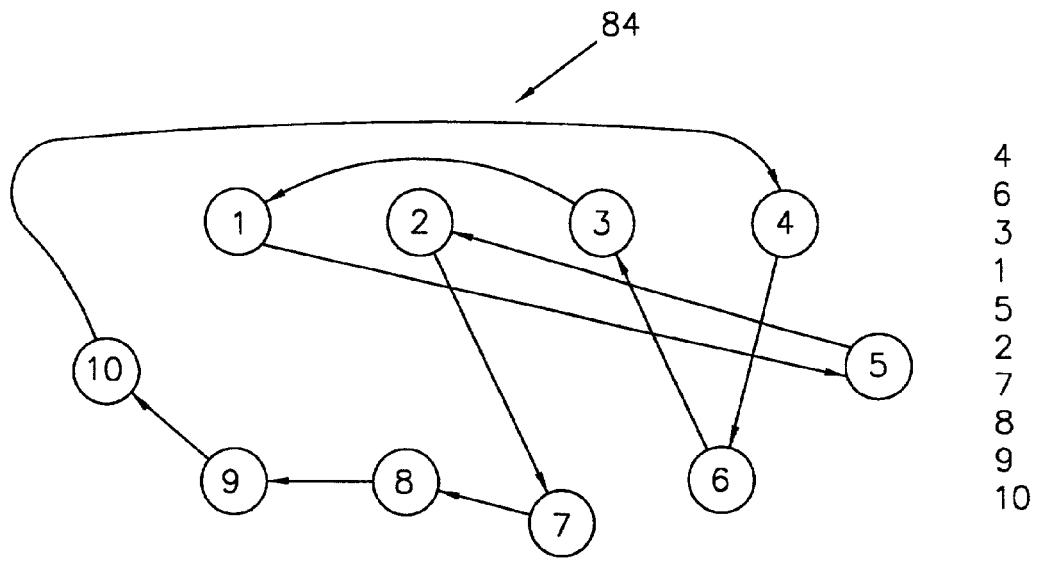
Figure 5:
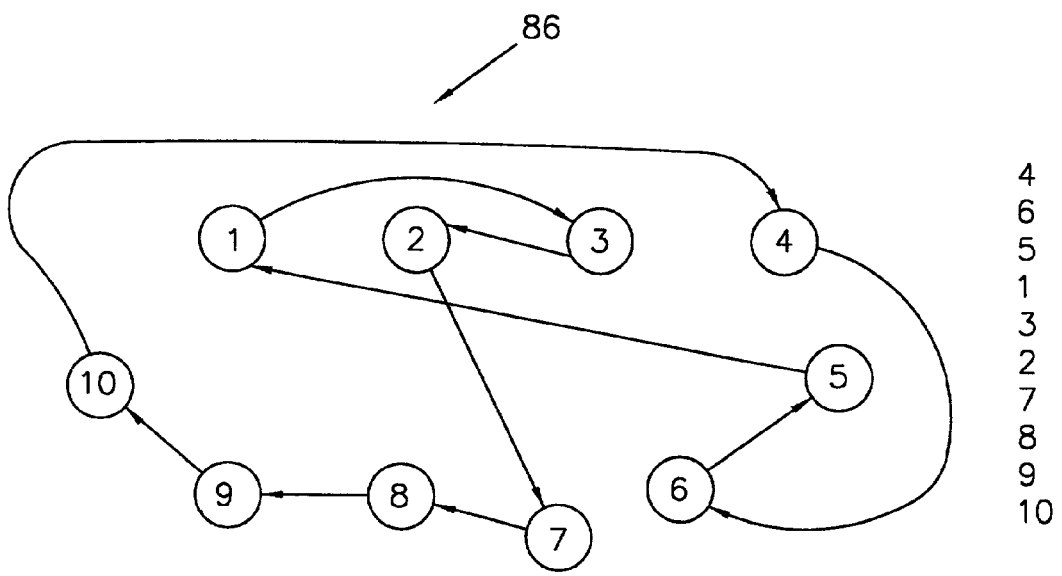
Figure 6:
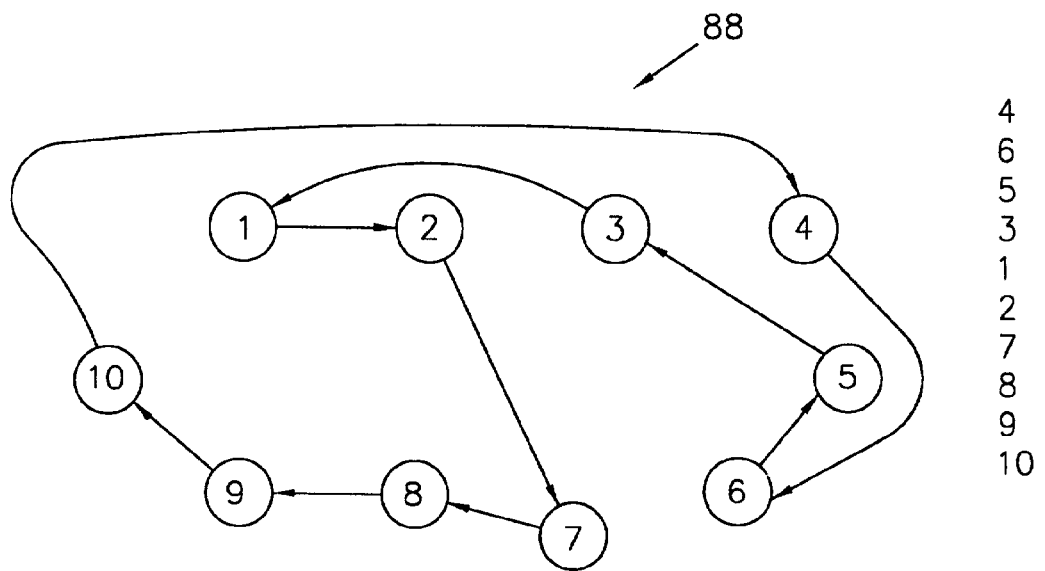
Figure 7:
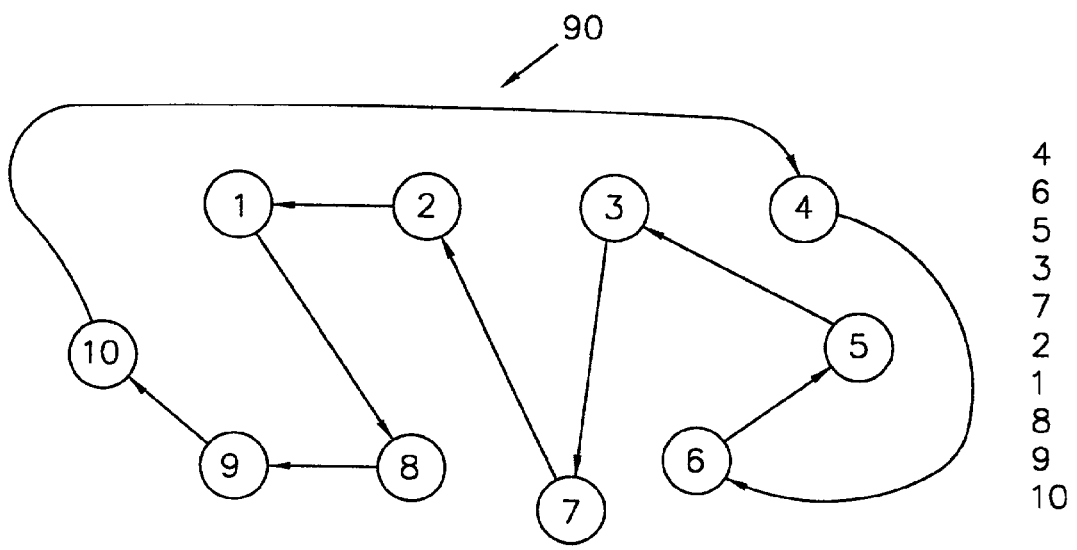

In this example, we assume that the next pair of branch exchanges that results in a reduced cost, subsequent to the exchange of 1 and 4, is the exchange of nodes 2 and 6. The configuration 84 resulting from the exchange of nodes 2 and 6 is shown in FIG. 4. At this point in the testing, one can assume that the links described by branches 4 and 6 are fixed and require no further switching in the test sequence. The process can continue to the configuration 86 shown in FIG. 5, where we have assumed that switching nodes 3 and 5 reduces the cost function. In FIG. 6, the exchange of nodes 1 and 3 again reduces the cost function, resulting in configuration 88. In FIG. 7, we assume that the exchange of nodes 1 and 7 has again reduced the cost function, resulting in configuration 90. This local transformation process can continue around the ring until the last pair of nodes in the ring-nodes 9 and 10 are switched, thus completing the optimization of the ring.

Figure 8:
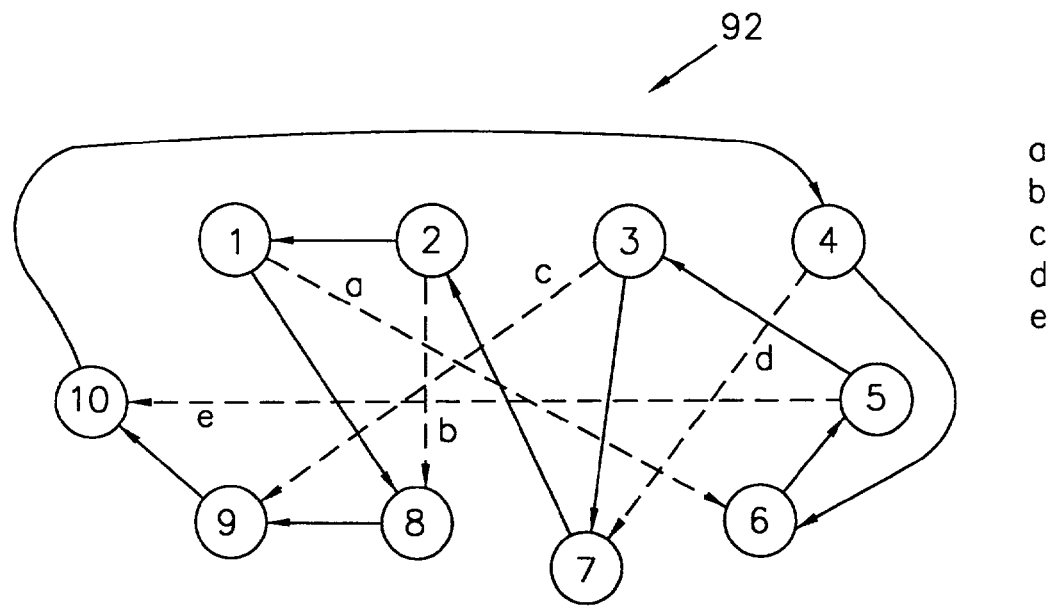
FIGS. 8–11 are illustrations of an embodiment of a crosslink formation example for a network topology incorporating features of the present invention.
Figure 10:
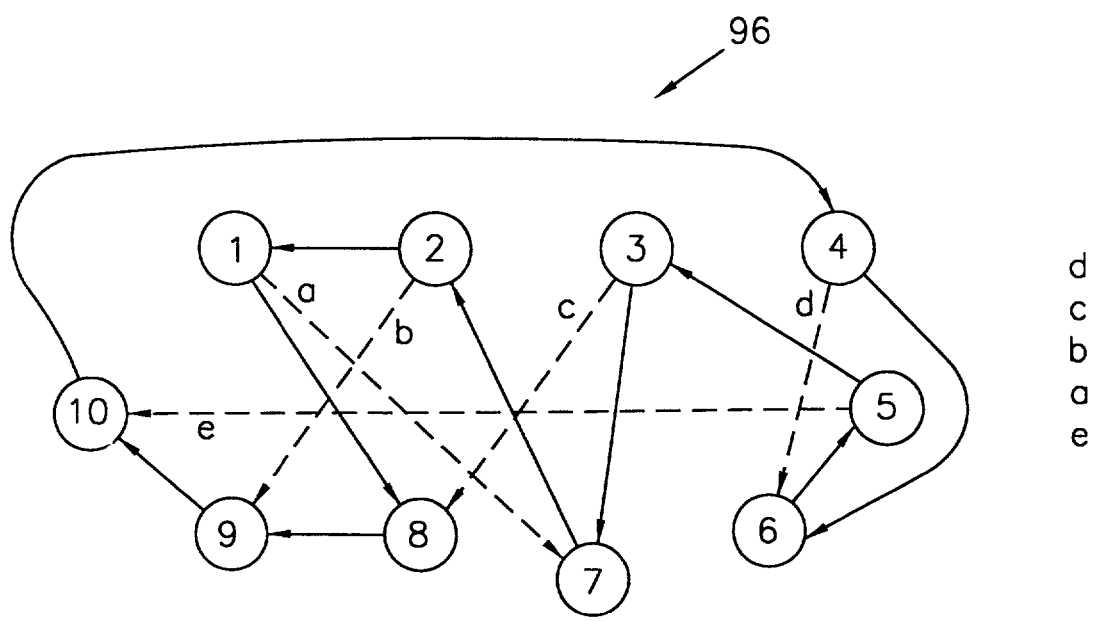
Figure 11:
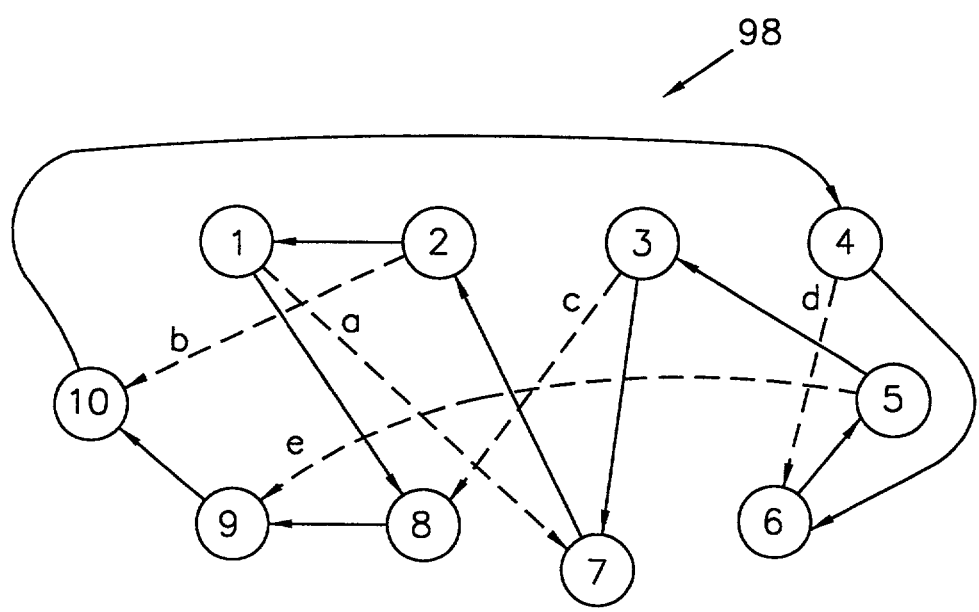
Figure 16A:
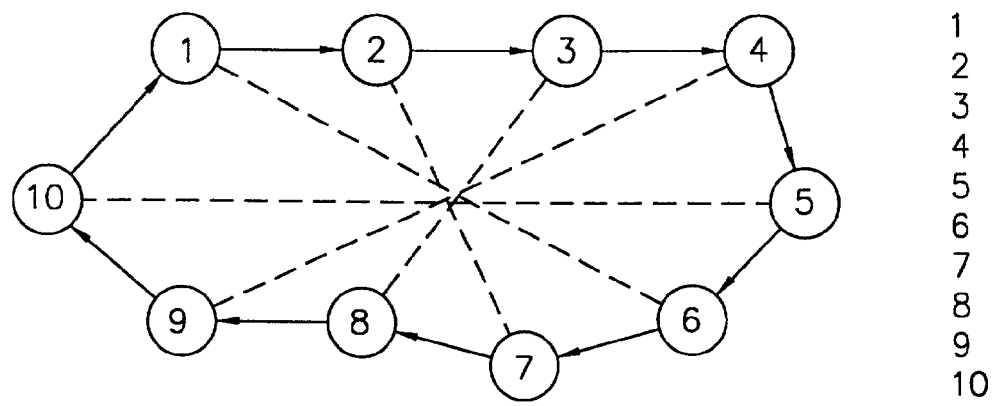
FIGS. 16a through 16f are illustrations of an embodiment of link optimization using loop and cross-link optimization simultaneously.
Figure 16B:
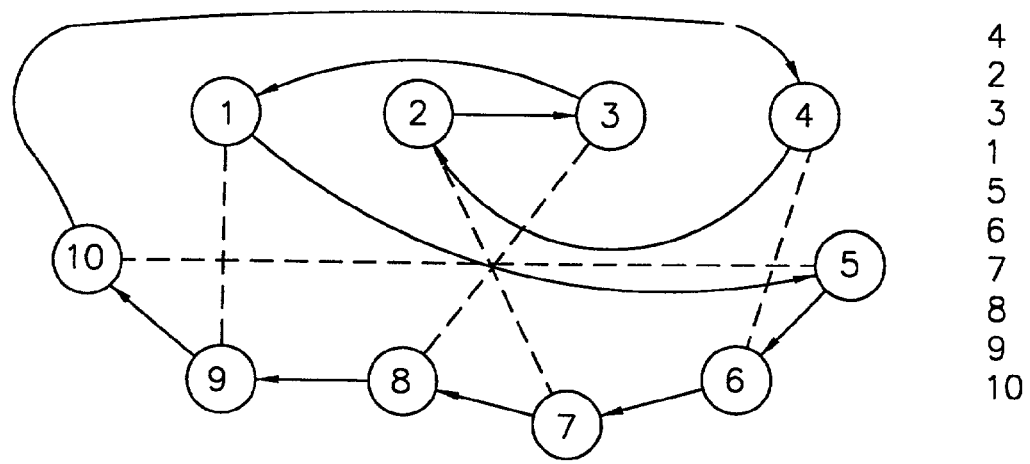
Figure 16C:
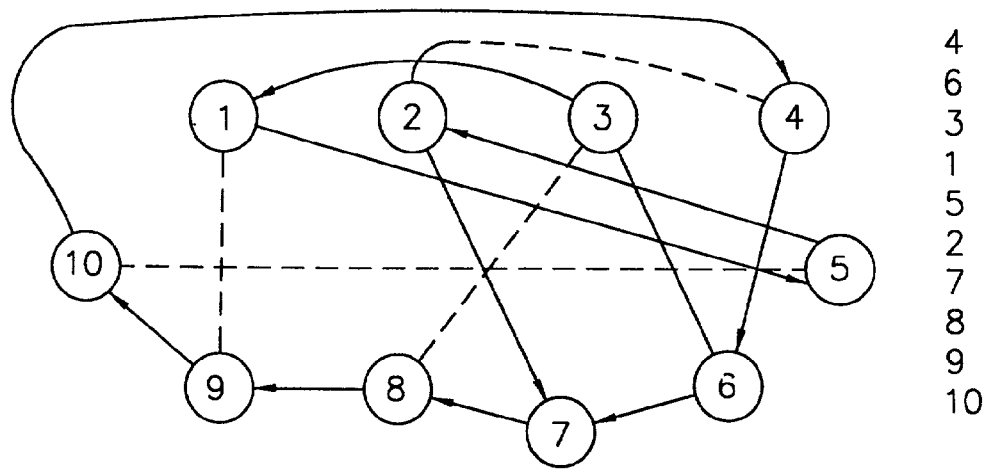
Figure 16D:
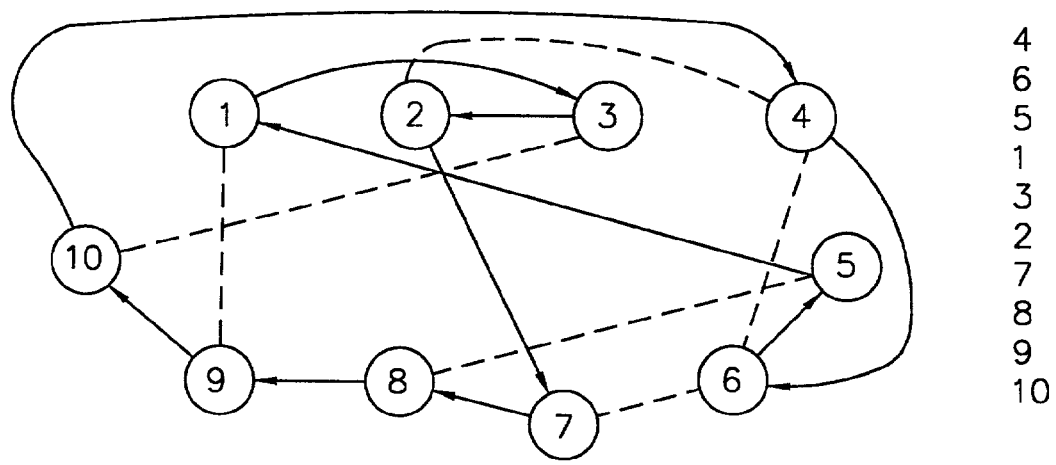
Figure 16E:
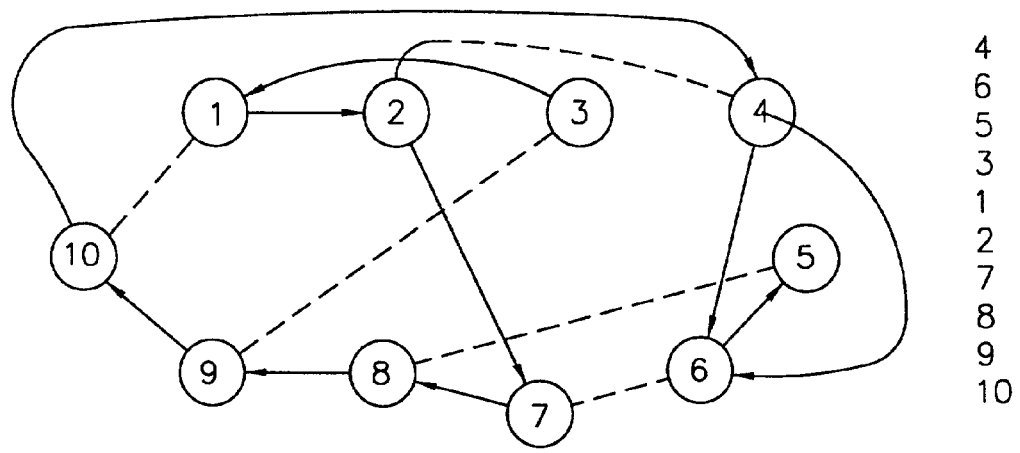
Figure 16F:
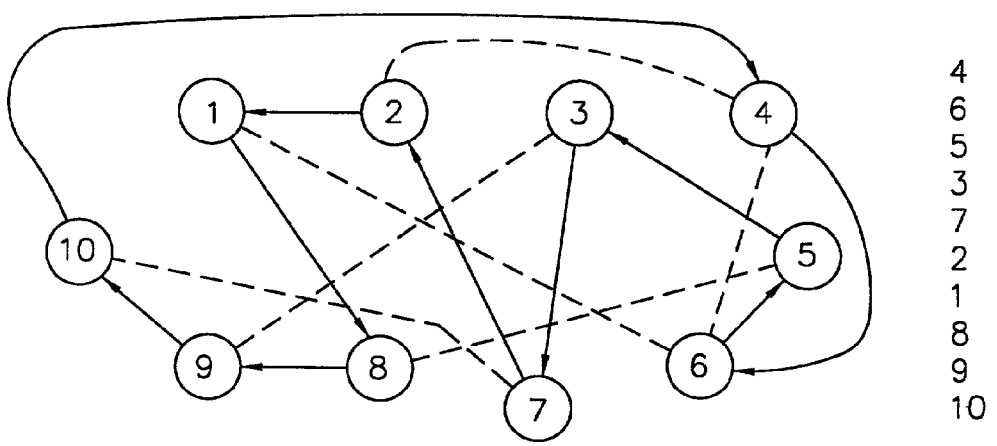

Once the ring structure resulting in a local minimum cost has been established it remains fixed. A second tier of link order replacement testing can be considered using the remaining nodal links. For example, referring to FIGS. 8–11, a crosslink formation example incorporating features of the present invention is shown, where the underlying ring structure is assumed. The candidate structure 92 is shown in FIG. 8. Each node 20 is assumed to have three links 22 with no single link nodes available and no secondary clusters. It can be noted that because of the assumed underlying ring structure, some of the possible secondary third node links would not be valid. For example, one might not want link "a" pointing to nodes 2 or 8. In this example, we assume that testing link "a" with the other links results in a lower overall cost function when link "a" is switched with link "d". The ring structure 94 of FIG. 9 results from the exchange of link "a" with link "d". Next, we assume testing a switch of links "b" and "c" lowers the cost function resulting in the configuration 96 shown in FIG. 10. Assume a final cost reduction by switching links "b" and "e". The final configuration 98 is shown in FIG. 11.

Figure 9:
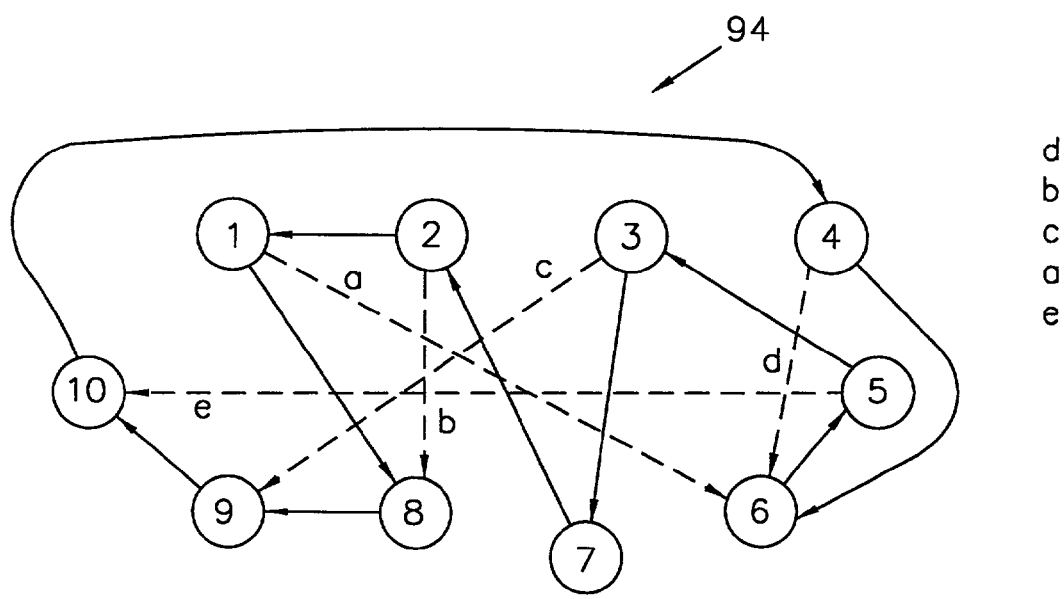

In one embodiment the present invention can be performed in a matrix manipulation. For example consider the connections as shown in FIG. 2. In matrix form this network can be described as seen in FIG. 12. The process of switching two links as shown in FIG. 3 can be done in matrix form by switching rows. and columns for the two links. The result is shown in FIG. 13 The matrix of FIG. 15 was formed from the matrix of FIG. 14 by switching column 1 with column 4 and switching row 1 with row 4. The second stage of the branch exchange process can be performed in a like manner considering only the crosslink. For example consider the crosslinks shown in FIG. 8. These links can be portrayed in matrix form as shown in FIG. 14. The process of exchanging two of the crosslinks as shown in FIG. 9 can be shown in matrix form by exchanging columns 1 and 4 and rows 1 and 4 in FIG. 15. The exchange is shown in FIG. 16. A second example of using branch exchange techniques to locate a local minimum in a network optimization scheme can be seen in FIGS. 16a–16f.

As seen in FIGS. 16a–16f the optimization procedure begins with loop links and crosslinks in place. In this case, an exchange of nodes also exchanges the crosslinks connected to the nodes. The exchange is actuated by exchanging rows and columns in a link matrix as described previously. However, rather than beginning with the matrix of FIG. 12, we begin with the matrix of FIG. 17 where crosslinks are designated by the number two.

After performing the optimization indicated in FIGS. 16a–16f a second stage involving only exchange of crosslinks can be performed as previously outlined. The optimization procedure shown in FIGS. 16a–16f has the advantage of performing a cost function test over an entire network rather than over a loop structure alone. When performing exchange of the crosslinks alone, a full network structure is also constructed at each cost function test. In this way there are no leaps of faith between stages of the optimization and a valid local minimization point can be found.

Figure 18:
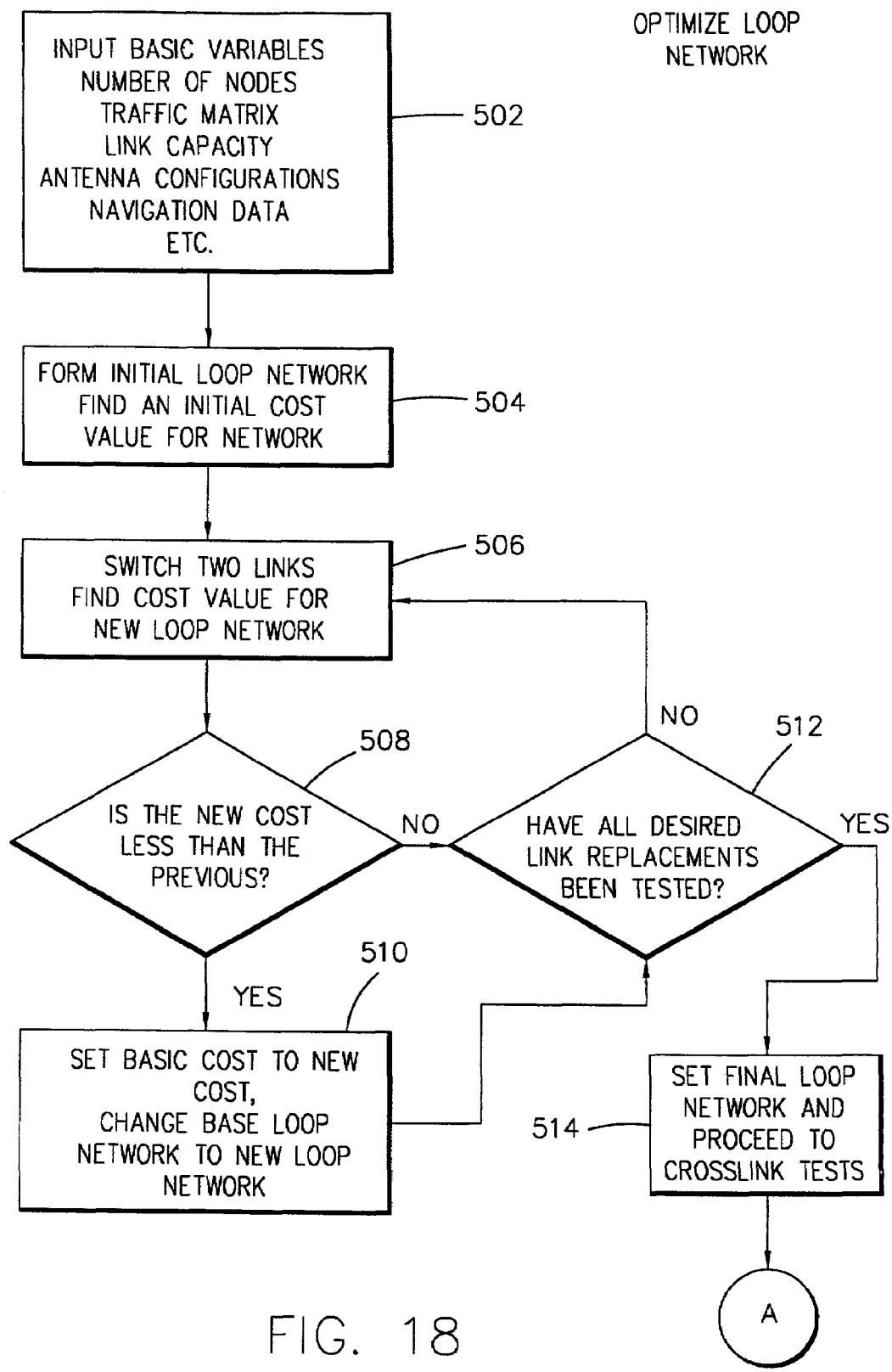
FIG. 18 is a flow chart of one embodiment of a method of loop network optimization incorporating features of the present invention.
Figure 19:
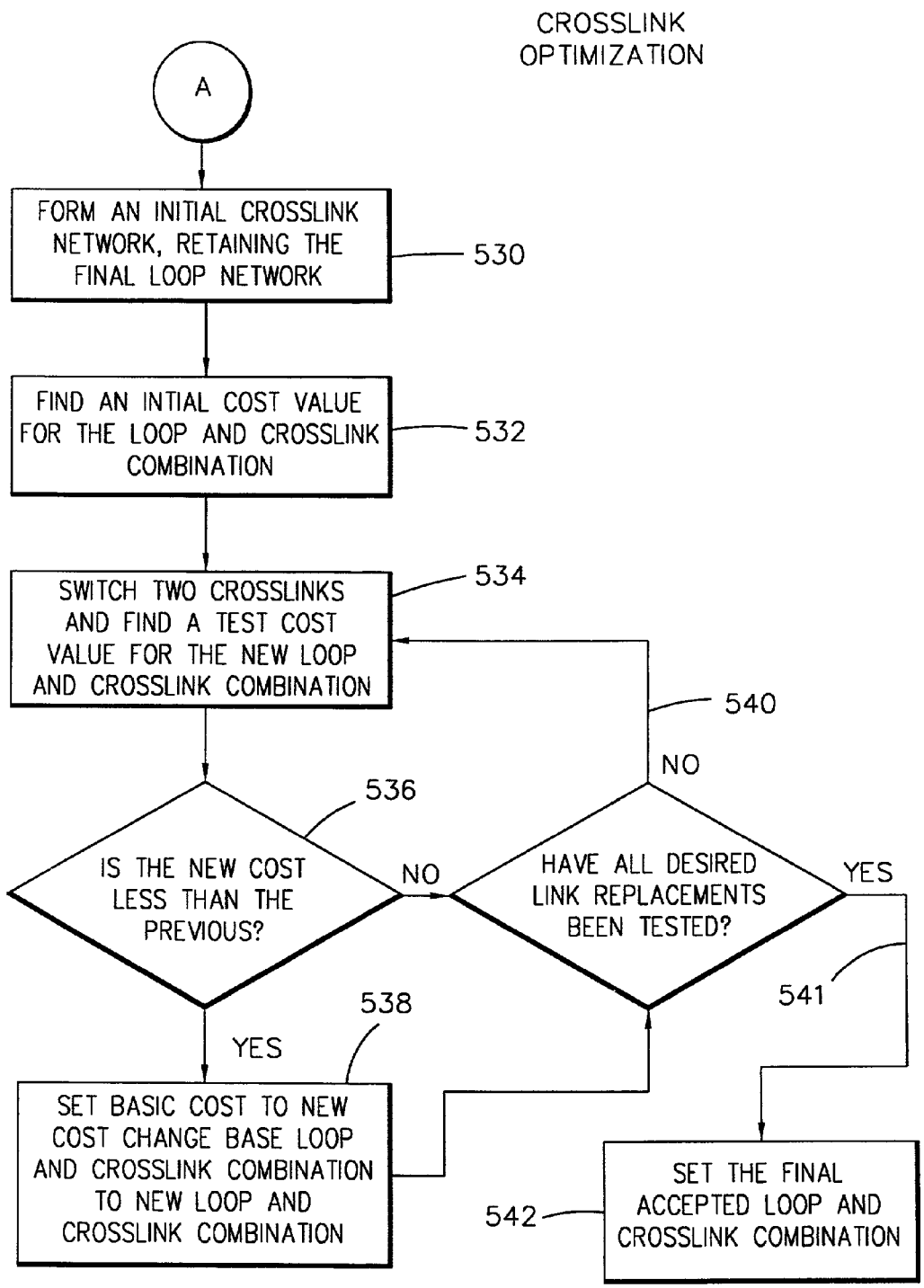
FIG. 19 is a flow chart of one embodiment of a method of crosslink optimization incorporating features of the present invention.
Figure 20:
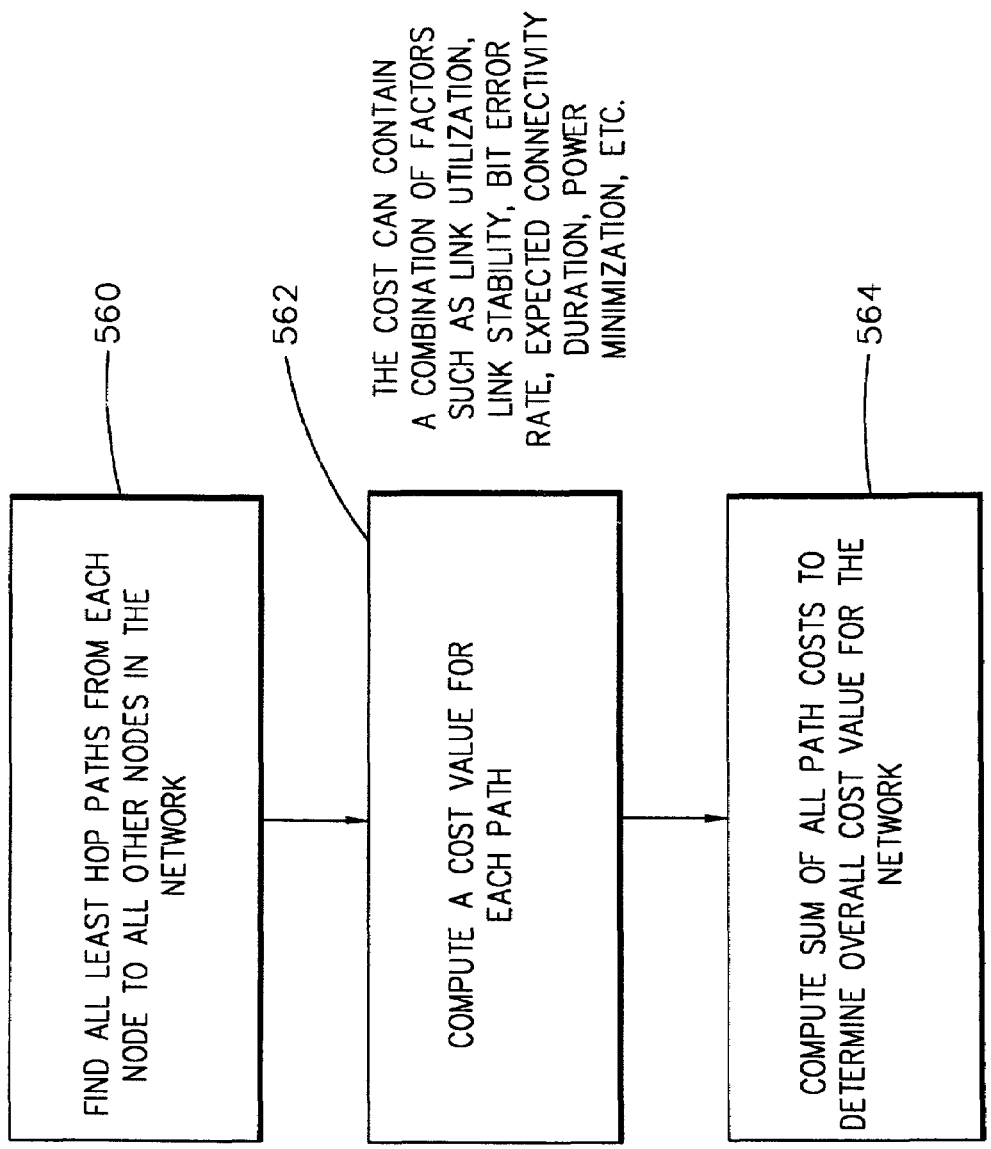
FIG. 20 is a flow chart of one embodiment of a method of cost function optimization incorporating features of the present invention.

The flow diagrams of FIGS. 18–20 generally outline a method incorporating the functional aspects of the Link Order Exchange Program in accordance with features of the present invention. Referring to FIG. 18, a flowchart illustrating one embodiment of a method of optimizing a loop network is shown. The basic variables of the loop determined are 502 and can include the number of nodes of the loop, the traffic matrix of the loop, the link capacity, antenna configurations and navigation data, among other things. The initial or base loop network is formed and an initial or basic cost value is calculated 504 for the network. At least two links are then switched forming a new loop network and a new cost value calculated 506 for the new loop network formed by the switch. A determination 508 is made as to whether the new cost value of the new loop network is less than the cost value of the previous loop network. If the new cost value is less than the previous or initial cost value, the basic cost for the loop network is set to the new cost value, and the new loop network is established 510 as the base or initial loop network.

It is then determined 512 if all desired link replacements have been tested. If not, the links are again switched and a "new" cost value is determined for the new loop network formed by the switch 506.

If, in step 508, it is determined that the new cost value is not less than the previous cost value, it is then determined 512 if all desired link replacements have been tested. If not, the method returns to step 506. If, in step 512, it is determined that all desired link replacements have been tested, the final loop network configuration is set 514, and crosslink testing can be initiated.

Referring to FIG. 19, after the final loop network configuration is set, step 514 in FIG. 18, an initial crosslink network is formed 530, retaining the final loop network. An initial cost value is calculated 532 for the loop and crosslink combination. The two crosslinks can then be switched 534 and a test cost value is found for the new loop and crosslink combination. A determination 536 is then made if the new cost value is less than the initial or previous cost value. If not, it is determined 540 if all desired link replacements have been tested. If the new cost value is less than the previous cost value in step 536, the basic cost for the loop and crosslink combination is set to the new cost. The base loop and crosslink combination is then established 538 as the new loop and crosslink combination for the network. If all desired link replacements have been tested 541 the base loop and crosslink combination is set, or established as, the final accepted loop and crosslink combination. If all desired link replacements have not been tested 540, two crosslinks of an untested link replacement are switched and a new test cost value for the new loop and crosslink combination is determined 534.

One embodiment of a method to compute a cost value for a loop and crosslink combination is illustrated in FIG. 20. All least hop paths from each node to all other nodes in the network are determined 560. A signal transit from one node directly to another is a hop. When a signal has to travel through several nodes to reach its destination it is desirable to minimize the number of hops it takes in transit. Therefore we seek for a least hop path for the signal. A cost value is computed 562 for each path. The sum of all path costs is computed to determine 564 an overall cost value for the network. The costs can include a combination of factors, such as for example, link utilization, link stability, bit error rate, expected connectivity duration and power minimization, among other things.

The present invention functions well for a network where all nodes contain 3 antennas. However, the present invention can also be adapted for a network with one, two or three antennas at a node where more flexibility is needed than simply using a two dimensional matrix and exchanging rows and columns for branch exchange. In this embodiment, the branch exchange package tests the available nodes for available antennas and works with one dimensional lists (arrays) containing those nodes eligible for bi-connectivity and/or crosslink connections. At least two antennas are needed for bi-connectivity and participation in a basic ring structure. Those participants of a ring require an additional antenna (three total) to add a crosslink capability. However, a node with a single antenna can participate in the network by connecting to a ring node through a crosslink or third antenna.

Implementation of this branch exchange algorithm is similar to those methods previously mentioned. The optimization procedure is generally described below:

1. Assemble candidate nodes in a list.
2. Test candidate nodes for 2 or more antennas.
3. Form a ring structure with those having 2 or more antennas.
4. Test candidate nodes for crosslink capability (need more than 2 antennas).
5. Add crosslinks to network ring in a structure to minimize the paths from one node to another.
6. Test total structure for cost.
7. Compare cost to previous cost.
8. If cost is less then accept new structure.
9. If cost is not less revert to previous structure.
10. Switch two ring link positions in present structure and return to step 2.
11. When all candidate ring structures have been tested, accept best and continue stage 2 optimization.

Stage 2

12. From best fixed structure found above.
   A. Test candidate nodes for applicability to crosslinks.
   B Form crosslink list.
   C. Switch two crosslinks.
   D. Form new total network structure with best ring solution and new crosslinks.
   E. Test with a cost function.
   F. If cost is less than previous accept new crosslink structure.
   G. If cost not less than previous retain previous crosslink structure.
   H. Loop back to B.
13. End when all candidate crosslink structures have been tested.

In the present invention, one of the keys is to maintain a basic network structure throughout the process. The process has been demonstrated using a ring structure. All candidate nodes are maintained in bi-connectivity in a ring throughout the optimization. In addition, those ring nodes that can also support a crosslink are allowed to do so. The second stage of optimization guarantees crosslink optimization as well as inclusion of nodes with single antennas. The overall procedure can reduce possible test structures by orders of magnitude while guaranteeing optimization to a local cost function minimum.

The steps described above are directed to one embodiment of the present invention, and it will be understood by those of skill in the art that those steps demonstrate a general philosophy that can be embodied and practiced in alternative ways. For example, the first sequence of optimization steps described, maintained and optimized a ring structure alone. In practice, one refinement might maintain the ring structure, but also combine the candidate crosslinks before exercising the cost function analysis. Thus the ring structure optimization is combined with the crosslink optimization, rather than being separated as in the example described above. This refinement would generate a much greater number of candidate configurations, and therefore might yield a better local minimum, but will also require considerably more machine operations. In some applications, the one practice might be obviously preferable to the other.

Figure 21:
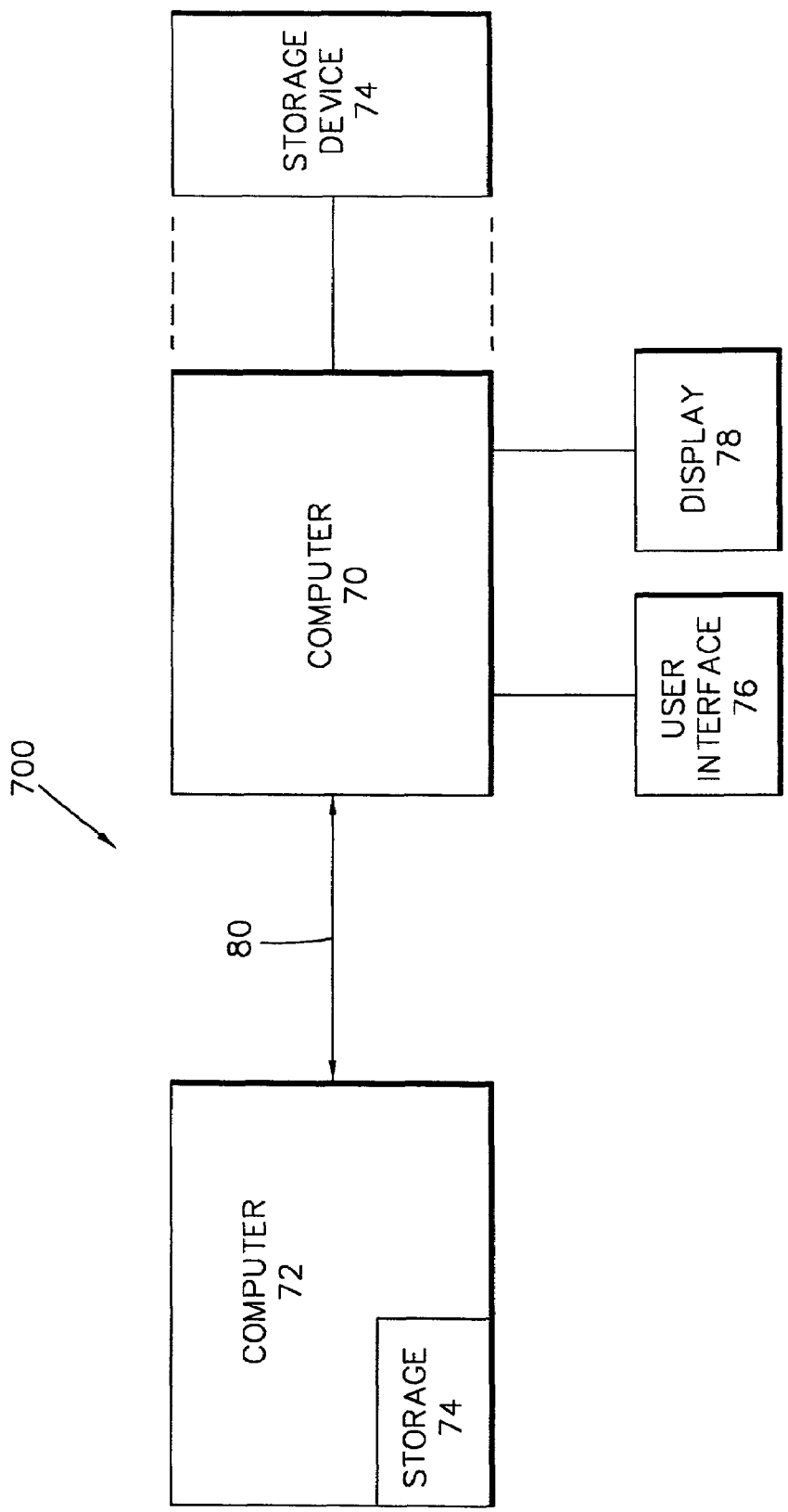
FIG. 21 is a block diagram of one embodiment of an apparatus that can be used to practice the present invention.

The present invention may also include software and computer programs incorporating the process steps and instructions described above that are executed in different computers. FIG. 21 is a block diagram of one embodiment of a typical apparatus incorporating features of the present invention that may be used to practice the present invention. As shown, the system 700 can include one or more computers or computer systems 70. A computer system 70 may be linked to another computer system 72, such that the computers 70 and 72 are capable of sending information to each other and receiving information from each other. Although computers 70 and 72 are shown as separate components, it should be recognized by those of skill in the art that computers 70 and 72 could comprise a single computer or computer system. In one embodiment, computer system 72 could include a server computer adapted to communicate with a network, such as for example, the Internet. Computer systems 70 and 72 can be linked together in any conventional manner including a modem, hard wire connection, or fiber optic link. Generally, information can be made available to both computer systems 70 and 72 using a communication protocol typically sent over a communication channel 80 such as the Internet, or through a dial-up connection on ISDN line. Computers 70 and 72 are generally adapted to utilize program storage devices embodying machine readable program source code which is adapted to cause the computers 70 and 72 to perform the method steps of the present invention. The program storage devices incorporating features of the present invention may be devised, made and used as a component of a machine utilizing optics, magnetic properties and/or electronics to perform the procedures and methods of the present invention. In alternate embodiments, the program storage devices may include magnetic media such as a diskette or computer hard drive, which is readable and executable by a computer. In other alternate embodiments, the program storage devices could include optical disks, read-only-memory ("ROM") floppy disks and semiconductor materials and chips.

Computer systems 70 and 72 may also include a microprocessor for executing stored programs. Computer 70 may include a data storage device 74 on its program storage device for the storage of information and data. The computer program or software incorporating the processes and method steps incorporating features of the present invention may be stored in one or more computers 70 and 72 on an otherwise conventional program storage device. In one embodiment, computers 70 and 72 may include a user interface 76, and a display interface 78 from which features of the present invention can be accessed. The user interface 76 and the display interface 78 can be adapted to allow the input of queries and commands to the system 700, as well as present the results of the commands and queries.

The present invention generally provides for determining the optimal link assignments for a network that contains multiple nodes each with one or more communication links or antennas and allows network topology to be assinged, connected and restructed in a dynamic, optimal manner.

The present invention uses a new means for ordering and reordering link connections in a hierarchal structure that greatly reduces the number of candidate network mesh constructs. Each candidate construct is guaranteed to maintain a desired bi-connectivity with a specified form factor. While the overall optimization procedure is sub-optimal, the procedure is guaranteed to approach a local minimization with an ever descending slope. As the number of nodes in a network increases, the complexity of operations needed to optimize the network topology by standard techniques becomes untenable. The present invention reduces the viable candidate structures to be examined by orders of magnitude. Those structures that do not have a desirable pre-designated form factor are automatically not considered in the process.

It therefore becomes possible to optimize network topology structures of significant size in very reasonable computation times.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method of optimizing a mobile radio network topology for an N node network, each node having K connecting links, the method comprising the steps of:
   establishing a base network topology and determining a cost value for the base network;
   determining if all possible local transformations on the base network topology have been performed, and if not;
   performing a local transformation on the base network to form a transformed network;
   calculating a cost for the transformed network;
   comparing the cost of the transformed with the cost of the base network; and
   establishing the transformed network as the base network if the cost of the transformed network is less than the cost of the base network.

2. The method of claim 1, further comprising repeating the steps, if the cost of the transformed network is not less than the cost of the base network, of:
   determining if all possible local transformations on the base network topology have been performed, and if not;
   performing a local transformation on the base network to form a transformed network;
   calculating a cost for the transformed network;
   comparing the cost of the transformed with the cost of the base network; and
   establishing the transformed network as the base network if the cost of the transformed network is less than the cost of the base network.

3. The method of claim 1 further comprising repeating the steps, until all possible sequences of local transformations have been exhausted, of:
   determining if all possible local transformations on the base network topology have been performed, and if not;
   performing a local transformation on the base network to form a transformed network;
   calculating a cost for the transformed network;
   comparing the cost of the transformed network with the cost of the base network; and
   establishing the transformed network as the base network if the cost of the transformed network is less than the cost of the base network.

4. The method of claim 1 wherein the step of performing a local transformation comprises the step of adding a new link in the network and deleting an old link in the network, generally by exchanging branches of the network topology, wherein connectivity between the nodes of the network is maintained.

5. The method of claim 1 may be constrained in various manners, as for instance, the step of performing a local transformation further comprises the step of maintaining a minimum of one link per node and a maximum of three links per node.

6. The method of claim 1 wherein the candidate configuration is a ring structure and wherein each node has at least two links.

7. The method of claim 6 further comprising the step of adding to the ring structure all nodes having one or three links available.

8. The method of claim 1 wherein the step of performing a local transformation comprises the steps of:
   defining a starting node position for the candidate configuration;
   exchanging a node in the starting node position with a next node in a position subsequent to the starting node position and determining a new cost for the test configuration formed by the exchange; and
   repeating the step of exchanging for each node N in the candidate configuration subsequent to the starting node until the new cost is less than the starting cost, wherein the test configuration is accepted as a new configuration.

9. The method of claim 8 further comprising the step of repeating the step of exchanging the node in the starting node position for the new configuration, wherein the step of exchanging starts with the node in the new configuration that has not been exchanged with the node in the starting position.

10. The method of claim 8 further comprising the step of repeating the step of exchanging the node in the starting node position for the new configuration, wherein the step of exchanging starts with a node in the new configuration in a first node position subsequent to the node in the starting position.

11. A method of optimizing a loop network comprising the steps of:
    determining an initial cost value for an initial loop network;
    switching at least two links in the initial loop network forming a new loop network;
    determining a new cost value for the new loop network; and
    determining if the new cost value is less than the initial cost value, and if so establishing the new loop network as a base loop configuration for the loop network.

12. The method of claim 11 further comprising repeating the steps, if the new cost value is not less than the initial cost value, of:
    switching at least two links in the initial loop network to form a new loop network;
    determining a new cost value for the new loop network; and
    determining if the new cost value is less than the initial cost value, and if so establishing the new loop network as a base loop configuration for the loop network.

13. The method of claim 11 further comprising the steps of:
    determining if all desired replacement links have been tested; and if not repeating the steps of:
    switching at least two links in the initial loop network to form a new loop network.

14. The method of claim 11 further comprising the step of establishing the base loop configuration as a final loop configuration as a final loop network configuration if all desired link replacements have been tested.

15. The method of claim 11 further comprising the step of:
    forming an initial crosslink network for the final loop network in combination;
    calculating an initial cost value for the initial crosslink network and final loop network combination;

switching at least two crosslinks to form a new loop and crosslink combination and determine a new cost value for the new loop and crosslink combination; and determining if the new cost value is less than the initial cost and if so, establishing the new cost value as the initial cost value for the loop network.

16. The method of claim 15 wherein the step of determining an initial cost value for the loop and crosslink combination comprises the steps of:

determining all least hop paths from each node in the loop network to all other nodes in the loop network;

calculating a cost value for each path; and computing a sum of the cost value for each path to determine an overall cost value for the loop network.

17. A computer program product comprising:

a computer useable medium having computer readable program code means embodied therein for causing a computer to optimize a loop network, the computer readable program code means in the computer program product comprising:

computer readable program code means for causing a computer to determine an initial cost value for an initial loop network configuration;

computer readable program code means for causing a computer to switch at least two desired replacement links in the initial loop configuration to form a test configuration;

computer readable program code means for causing a computer to determine a new cost value for the test configuration;

computer readable program code means for causing a computer to accept the test configuration as an initial loop configuration if the new cost value is less than the initial cost value;

computer readable program code means for causing a computer to determine if all desired replacement links in the initial loop configuration have been tested; and computer readable program code means for causing a computer to accept the initial loop configuration as a final loop configuration if the new cost value is less than the initial cost value and all desired replacement links have been tested.

18. The computer program product of claim 17 further comprising:

computer readable program code means for causing a computer to form an initial crosslink network with the final loop network in combination;

computer readable program code means for causing a computer to calculate an initial cost value for the initial crosslink network and final loop network combination;

computer readable program code means for causing a computer to switch at least two crosslinks to form a new loop and crosslink combination and determine a new cost value for the new loop and crosslink combination; and determining if the new cost value is less than the initial cost and if so, establishing the new cost value as the initial cost value for the loop network.

* * * * *